United States Patent [19]
Cota et al.

[11] 4,436,176
[45] Mar. 13, 1984

[54] DELAYED VEHICLE STARTER

[76] Inventors: Albert O. Cota, 17475 Flanders St., Granada Hills, Calif. 91344; Dean C. Obray, 624 23rd St., Manhattan Beach, Calif. 90266

[21] Appl. No.: 331,300
[22] Filed: Dec. 14, 1981
[51] Int. Cl.³ .............................................. B60R 25/04
[52] U.S. Cl. .................................... 180/287; 340/64
[58] Field of Search .............. 180/271, 272, 282, 283, 180/287, 288; 340/52 R, 62, 63, 64, 65, 573, 576; 307/10 AT

[56] References Cited
U.S. PATENT DOCUMENTS

| | | | |
|---|---|---|---|
| 3,611,344 | 10/1971 | Couper | 180/272 |
| 3,790,933 | 2/1974 | Cort | 340/64 |
| 3,956,732 | 5/1976 | Teich | 180/272 |
| 4,010,814 | 3/1977 | Adams | 340/64 |
| 4,090,089 | 5/1975 | Morello | 180/271 |
| 4,150,731 | 4/1979 | Tannenbaum | 180/287 |
| 4,151,507 | 4/1979 | Willis | 340/64 |
| 4,240,071 | 12/1980 | Ochiai | 180/287 |

Primary Examiner—Joseph F. Peters, Jr.
Assistant Examiner—Timothy Roesch
Attorney, Agent, or Firm—Albert O. Cota

[57] ABSTRACT

A delayed vehicle starter (DVS) that prevents a motor vehicle from being started and driven away before the driver has observed and determined that there are no persons or objects in the vicinity of the vehicle that may cause an impact. To preclude such an impact the driver must sequentially depress a series of switches, strategically located at the front and rear of the vehicle, within a preset time before the vehicle can be started. If the driver successfully performs the required sequential steps the DVS enables the vehicle ignition system allowing the vehicle engine to be started. Once started, the vehicle must then be moved for a predetermined distance within the preset time or the DVS will disable the vehicle ignition system. To restart the vehicle after the ignition system is disabled the required sequential steps must be restarted from the beginning.

13 Claims, 5 Drawing Figures

DELAYED VEHICLE STARTER

TECHNICAL FIELD

The invention pertains generally to the field of interlock devices that prevent motor vehicles from being started before certain conditions are fulfilled. More particularly the invention relates to delayed vehicle starters requiring that a series of switches be sequentially depressed within a preset time before the vehicle can be started and that once started the vehicle be moved within the preset time.

BACKGROUND ART

Industry and safety standards, as well as common sense, dictates that drivers of parked vehicles observe and ascertain that the area surrounding their vehicle is clear before the vehicle is started and moved. The obvious necessity for checking is to preclude an accidental impact with a nearby person or object. Such an impact besides resulting in personal injury or property damage may also lead to a legal action that can be financially disastrous to the driver and/or owner of the vehicle-particularly if the plaintiff can prove negligence on the part of the driver/owner. Because of the time constraints prevalent in the business world many drivers of commercial vehicles do not make or will make only a cursory observance of the vehicles surroundings which can and has led to such accidental impacts.

The state-of-the-art in commercial vehicles is to equip the vehicles with audible alarms that are activated only when the vehicle is placed in reverse gear and moved. This warning is adequate to alert most normal adults. However, children and adults with impaired hearing may have difficulty in understanding or hearing the warning sound. Additionally, an impact with an object cannot be prevented by an audible alarm. Safety procedures have also been adopted by many commercial carriers where use is made of rubber obstruction cones. These cones are placed by the driver at the front and rear of the vehicle when a work stop is made. The cones function to cause the driver to observe the surroundings of his vehicle when the cones are removed just prior to leaving the work stop. In theory this procedure is adequate. However, there is no assurance that the procedure will be followed and the practically of monitoring the drivers compliance to the procedure is, at best, difficult.

The prior art search did not disclose any invention that directly read on the instant invention. However, the following two patents are related:

| PAT. NO. | INVENTOR | ISSUED |
|---|---|---|
| 4,240,071 | Ochiai | 16 December 1980 |
| 4,010,814 | Adams | 8 March 1977 |

The Ochiai patent discloses a digital circuit for the prohibition of operating a motor vehicle by an intoxicated person. A steady control task, such as depressing the brake pedal, is imposed on the operator for a designated period of time as a means for evaluating his fitness to operate the vehicle. The Adams patent discloses an interlock system which prevents a vehicle engine from being started if a crew member is not present at a predetermined post remote from the driver. Indicators are provided for signalling the driver when the vehicle may be started.

DISCLOSURE OF INVENTION

The invention consists of a delayed vehicle starter (DVS) comprised of a primary first circuit and three additional optional circuits. The first circuit prevents the driver of a motor vehicle from starting and driving away before he has observed and determined that there are no persons or objects in the immediate vicinity of the vehicle. To preclude such an inadvertent vehicle impact the driver must depress a series of sequential and strategically located switches within a preset time before the vehicle can be started. If the driver successfully performs the required steps the DVS enables the vehicle ignition system allowing the vehicle to be started. Once started the vehicle must then be moved for a predetermined distance within the preset time or the DVS will disable the vehicle ignition system.

The second and third optional circuits augment the vehicle ignition system by including a parking-brake interlock assembly and a transmission interlock assembly. When the vehicle is disabled the brake interlock maintains a set parking brake in the set position and the transmission interlock maintains the transmission in a locked configuration. Both assemblies will release their respective vehicle components if the vehicle is started within the required preset time.

The fourth optional circuit allows the delayed starting features and the minimum travel requirements of the DVS to be bypassed and permit normal starting and operation of the vehicle. This circuit is intended for use during emergencies and/or maintenance actions.

In addition to providing an efficient and practical method for preventing or minimizing accidental impacts and solving a long felt need for achieving safety in the operation of commercial vehicles, it is also an objective of the DVS to provide an invention that:
- can be easily understood and used by the driver,
- can be easily installed and integrated with the vehicle components,
- uses readily available state-of-the-art components,
- is reliable and easily maintained,
- is cost effective particularly in terms of saved personal injuries and/or property damage, and
- can reduce or eliminate a law suit recovery based on negligence on the part of the defendant driver and/or vehicle owner.

BRIEF DESCRIPTION OF DRAWINGS

The details of the invention are described in connection with the accompanying drawings in which.

BEST MODE FOR CARRYING OUT THE INVENTION

Figure 1:
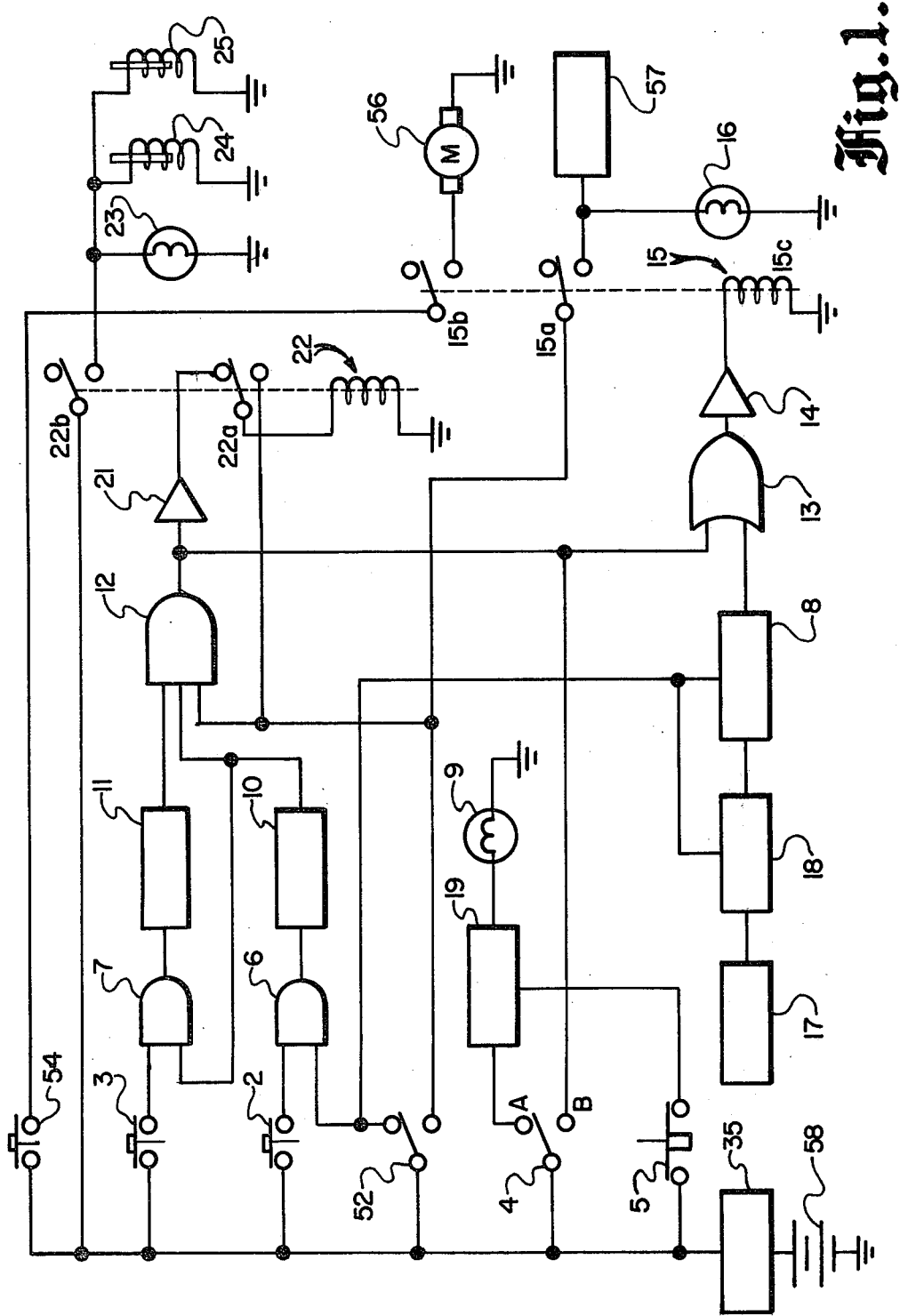
FIG. 1 is an overall schematic of the delayed vehicle starter.

The best mode for carrying out the invention of the Delayed Vehicle Starter (DVS) 1 is described in terms of its adaptability to a motor vehicle 50. The DVS 1 is comprised of a primary first circuit and three optional circuits. The first circuit may be used alone or all four circuits may be integrated into a single circuit as schematically depicted in FIG. 1. The numbering sequence 1-35 corresponds to components directly associated with the novel invention and 50-59 corresponds to existing vehicle components used in conjunction with the DVS 1.

The four circuits, including the vehicle components comprise twenty-nine major components: a first switch 2; a second switch 3; an emergency override switch 4; an emergency reset switch 5; a first two-input AND gate 6; a second two-input AND gate 7; a first bistable latch 8; an Emergency indicator 9; a first timer 10; a second timer 11; a three-input AND gate 12; an OR gate 13; a first amplifier 14; a first 2PDT relay 15; an Ok-To-Start indicator 16; a rotational transducer assembly 17, an electronic counter 18; a second bistable latch 19; a second amplifier 21; a second 2PDT relay 22; an Interlock Activated indicator 23; an electro-mechanical parking-brake interlock assembly 24; an electro-mechanical transmission interlock assembly 25; a power source 35; a vehicle ignition switch 52; a vehicle start switch 54; a vehicle starter motor 56; a vehicle ignition system 57; and a vehicle battery 58.

Figure 4:
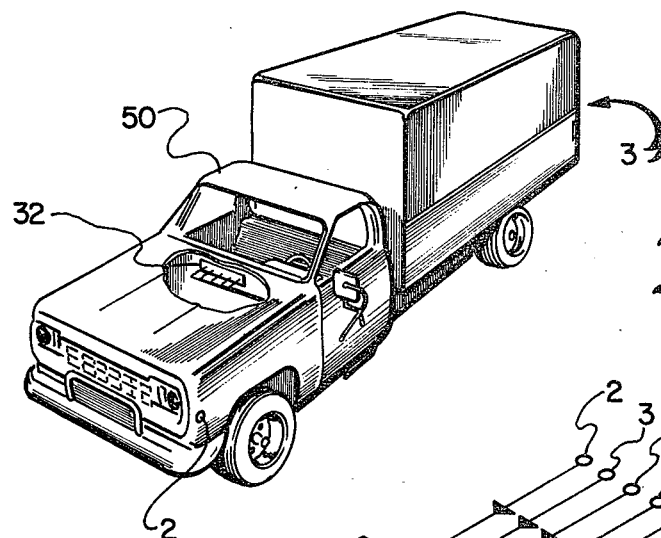
FIG. 4 is a perspective view of a typical motor vehicle showing the locations of the sequentially depressed switches.

The object of the DVS 1 is to prevent the driver of a motor vehicle from starting and driving away before he has observed and determined that there are no persons or objects in the immediate impact vicinity of the vehicle. To preclude such an inadvertent vehicle impact the driver or his designate must depress a series of sequential and strategically located switches within a preset time before the vehicle can be started. Once started the vehicle must then be moved within the preset time or the DVS will disable the vehicle ignition system. The locations of the sequentially depressed switches 2, 3, 52 and 54 as would typically be mounted on a vehicle is shown in FIG. 4.

The operation of the DVS 1 is commenced by refering to FIG. 1 and describing the operation of the first circuit which is considered the best mode for carrying out the invention. To commence operations, the vehicle ignition switch 52 must initially be placed in the OFF position. For the purpose of this discussion, the ignition switch 52 is considered to be configured as a single-pole double-throw (SPDT) switch. The pole of switch 52 is connected to a voltage level provided by the power source 35. In the best mode the power source 35 allows the use of the full vehicle battery 58 voltage and includes a power conditioner, such as a dc/dc converter, that provides voltages that are reduced to the required circuit levels. With the switch 52 in the OFF position the voltage is applied to one of the inputs of the first AND gate 6 and also serves as a reset signal to the electronic counter 18 and the first bistable latch 8.

To continue the operating sequence the first switch 2, located at the front of the vehicle 50, is next depressed. This switch when closed, applies a voltage from the voltage source 35 that constitutes the second enabling input to the first two-input AND gate 6. The output of the gate 6 is applied to and starts the operation of the first timer 10. The output of the timer 10 is active during its preset time and provides one of the inputs to the three-input AND gate 12 and the second AND gate 7. The next sequential switch depressed is the second switch 3 located at the rear of the vehicle 50. This switch functions in a similar manner as described for switch 2 and provides the second enabling input to the second two-input AND gate 7. Note, that in order to operate the DVS 1 the first switch 2 must be depressed before depressing the second switch 3. The output of gate 7 is applied to and starts the operation of the second timer 11. The output of the timer 11 is active during its preset time and provides the second input to the three-input AND gate 12.

The next operation is to place the vehicle ignition switch 52 to ON. In the ON position the switch 52 applies a voltage from the power source 35 to the pole of the first contact set 15a of the first 2PDT relay 15; to the energized contact of the first contact set 22a of the second 2PDT relay 22; and provides the third enabling signal input to the three-input AND gate 12. The relays 15, 22 may be of the electro-mechanical type or solid state devices.

The output of the enabled AND gate 12 is applied, in part, to the OR gate 13 which enables the gate. The output of the OR gate 13 is then applied through the first amplifier 14 to energize the coil 15c of the first relay 15. With the relay energized the vehicle battery 58 voltage from the power source 35 is applied through the ON contact of the ignition switch 52 and the closed contact of the first contact set 15a of the first relay 15 to the vehicle ignition system 57. When the ignition system 57 is enabled the parallel connected Ok-To-Start indicator 16 illuminates indicating to the driver that the vehicle can be started. The closed second contact set 15b of the first relay 15 allows the battery voltage 58 from the power source 35 to be applied to the starter motor 56 when the vehicle start switch 54 is placed in the ON position. At this point the vehicle 50 can be started, moved and driven in a normal manner.

After the engine is started the vehicle must be moved for a minimum travel distance within the preset time of the timers 10, 11. If not so moved the DVS 1, by means of the timers, will disable the vehicle ignition system 57 which, in turn, disables the vehicle. If the vehicle is moved however, a series of pulsed signals from the rotational transducer assembly 17 are applied to the input of the electronic counter 18. When the counter 18 reaches a preset count level, corresponding to an established minimum travel distance, an output signal is produced that is applied to the first bistable latch 8. The signal sets the latch 8 which then produces a signal that is applied to the two-input OR gate 13.

The output of the OR gate 13 being applied to the first amplifier 14 is thus maintained after the preset operating time of the first timer 10 and the second timer 11 expires. If the vehicle 50 is not moved for the minimum distance required to fill the counter 18 before the timers 10 and 11 expire, the first relay 15 will deenergize (drop-out) which will turn off the power necessary to maintain the vehicle ignition system 57 in an enabled condition. To restart the vehicle 50, the DVS 1 sequential starting sequence must be repeated commencing with the placement of the ignition switch 52 in the OFF position.

When the vehicle 50 is parked, turning OFF the ignition switch 52 resets the electronic counter 18 and first latch 8 such that the starting sequence of the DVS 1 must once again be repeated from the beginning.

Figure 2:
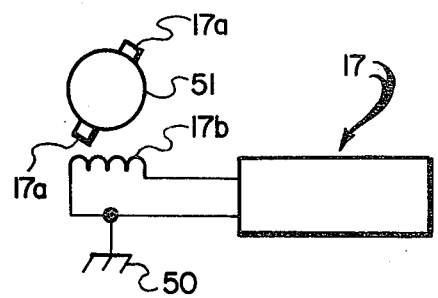
FIG. 2 is a detailed schematic of the rotational transducer assembly.

The rotational transducer assembly 17, as shown in FIG. 2, is comprised of a plurality of magnets 17a rigidly attached at equal points about the periphery of a rotating vehicle component such as the vehicle drive shaft 51, and an inductive coil 17b rigidly attached to a structural member of the vehicle 50 and positioned such that the magnets 17a are inductively coupled. Each time a magnet 17a rotationally passes the coil a pulse is inductively generated in the coil that is applied to the electronic counter 18. The function of the counter and subsequent circuits was previously described. As an alternative mounting scheme the magnets 17a may be attached to the vehicles speedometer shaft or a wheel rim in lieu of the drive shaft 51.

Figure 3:
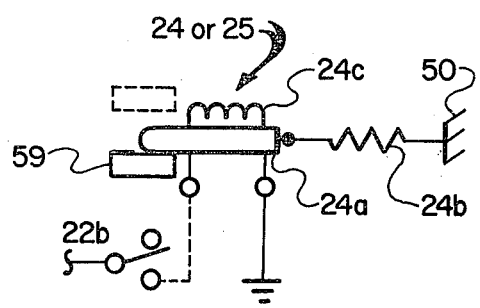
FIG. 3 is a detailed schematic of the electro-mechanical brake-interlock assembly and the transmission interlock assembly.

The second and third optional circuits, shown in FIG. 1, allow the use of the parking-brake interlock assembly 24 and the transmission interlock assembly 25 respectively. The details of these identical assemblies are shown in FIG. 3. When the vehicle 50 is disabled the brake-interlock assembly 24 is deenergized and the armature 24a is kept in the extended position by the forward bias provided by the spring 24b. One end of the spring 24b is attached to the back end of the armature 24a while the other is attached to a structural member of the vehicle 50. When in the extended position the armature 24a is inserted within a detent in the set parking-brake lever 59 that maintains the parking brakes in the set position. Likewise, the transmission interlock assembly 25 maintains the transmission steering column shift lever 59 in a locked position. To release the levers the following operational sequence occurs: the output of the enabled AND gate 12 is applied through the second amplifier 21 to the normally open contact of the first contact set 22a of the second relay 22 which causes the relay 22 to energize and to remain latched by a subsequent voltage supplied from the power source 35 through the closed ignition switch 52 and through the closed contact of the first contact set 22a. With the relay 22 in the energized position a positive voltage through the closed second contact set 22b energizes the coil 24c which causes the armatures 24a of the packing-brake interlock assembly 24, and transmission interlock assembly 25 to retract into the coil 24c. With the armature 24a retracted the parking brake lever 59 and transmission lever 59 are freed which allows the set parking brake to be released and the transmission steering column shift lever to operate normally. At the same time the interlock assemblies are energized the parallel connected Interlocks Activated indicator 23 is illuminated by the voltage which is also applied through the closed second contact set 22b. The illuminated indicator signifies to the driver that the two interlock assemblies 24, 25 have been activated.

The fourth circuit, also shown in FIG. 1, is an optional circuit that allows the delayed starting features and the minimum travel requirement of the first, second and third circuits to be bypassed and permit normal starting and operation of the vehicle 50. This circuit is intended for use during emergencies and/or maintenance actions.

The fourth circuit incorporates a SPDT emergency override switch 4. Under normal operation the switch 4 is kept in the "A" (first) position as shown in FIG. 1. In the first position the second bistable latch 19 is maintained in an inactive condition and no output is produced. Therefore, the emergency indicator lamp 9 will not illuminate. When the switch 4 is placed in the "B" (second) position a signal from the power source 35 is applied directly to the inputs of the second amplifier 21 and the two-input OR gate 13. These signals as previously described cause the first relay 15 and the second relay 22 to close. Thus, the delay and minimum travel distance circuits of the DVS 1 are effectively bypassed. With the switch 4 in the "B" position, the input signal to the second latch 19 is removed which sets the latch. In the set position the Emergency indicator lamp 9 will be illuminated by a voltage from the power source 35 that is applied through the normal closed emergency reset switch 5. The lamp 9 will remain illuminated until the latch 19 is reset by depressing the reset switch 5. The reset switch 5 in the best mode is a key operated type with the key available only to supervisory personnel. Thus, unnecessary or unauthorized use of the override switch 5 can be avoided or at least minimized since the activation of the emergency override switch 4 becomes evident and will require an explanation for its use.

Figure 5:
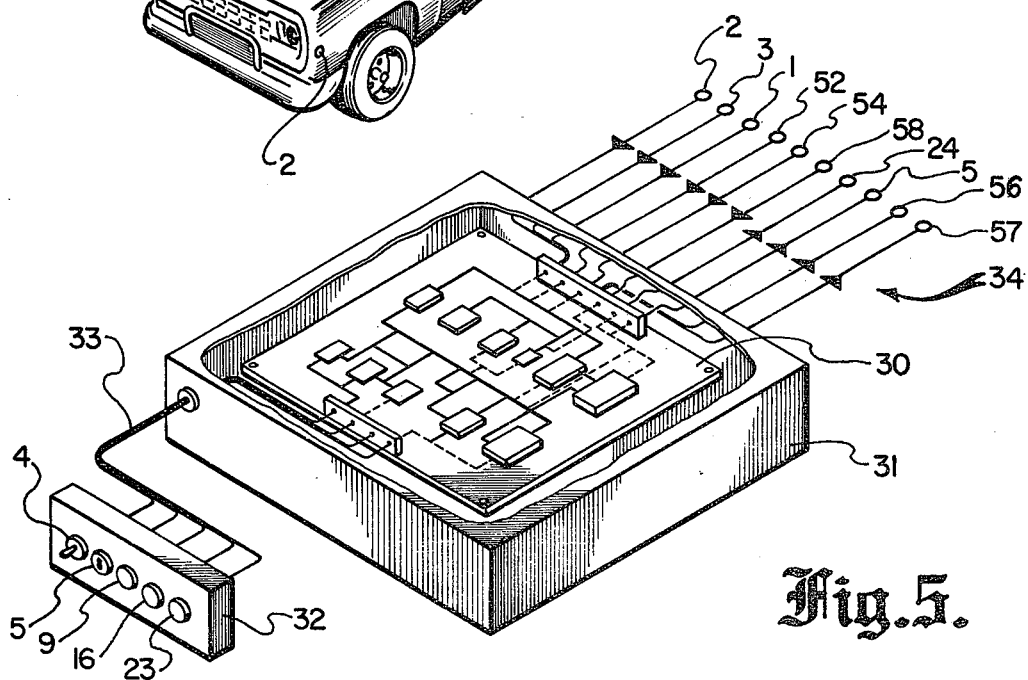
FIG. 5 is a perspective view of a suggested DVS packaging scheme.

The DVS 1 in its full component and minimum production configuration, as shown in FIG. 5, is comprised of the four previously described circuits where the majority of the circuit components are mounted to a printed circuit board (PCB) 30. The PCB is mounted within an enclosure 31 that has single cable connections 34 to the input components 2, 3, 17, 52, 54 and 58 and to the output components 24, 25, 56 and 57. The typical configuration also includes a panel 32 that retains the emergency override switch 4, the emergency reset switch 5, the Emergency indicator 9, the Ok-To-Start indicator 16 and the Interlocks Activated indicator 23. The panel 32, which may be mounted to the front panel of the vehicle 50, is connected to the enclosure 31 by the cable assembly 33. For production models, the DVS electronic circuits could be incorporated into a single monolithic integrated circuit that would then be mounted to a PCB. This configuration would reduce the packaging size and ultimately the cost of the DVS.

Although the invention has been described in complate detail and pictorally shown in the accompanying drawings, it is not to be limited to such ddetails since many changes and modification may be made to the DVS 1 without departing from the spirit and scope thereof. Hence, the invention is described to cover any and all modifications and forms which may come within the language and scope of the claims.

We claim:
1. A Delayed Vehicle Starter contained within the structure of a motor vehicle and comprised of a first circuit that prevents the driver of the motor vehicle from starting the vehicle before the driver has sequentially depressed, within a preset time, a plurality of electrical switches and where once started the vehicle must be moved for a minimum distance, within said preset time, to keep the vehicle ignition system enabled, where said first circuit comprises:
 (a) a power source,
 (b) a motor vehicle ingition switch where the pole of said ignition switch is connected to said power source such that when said ignition switch is placed in the OFF position a voltage, in part, from said power source is applied to one of the inputs of a first two-input AND gate,
 (c) a first switch connected to said power source such that when said first switch is closed the second enabling input is applied to said first two-input AND gate,
 (d) a first timer that is enabled by the output of said first two-input AND gate where said first timer is active during its preset time and its output provides one of the inputs to a second two-input AND gate and one of the inputs to a three-input AND gate, (e) a second switch connected to said power source such that when said second switch is closed, subsequent to the closing of said first switch, the second enabling input is applied to said second two-input AND gate, (f) a second timer that is enabled by the output of said second two-input AND gate where said second timer is active during its preset time and its output provides the second input to said three-input AND gate, where the third enabling input to said three-input AND gate is applied when said vehicle ignition switch is placed in the ON position, (g) a two-input OR gate that is initially enabled by the output from said three-input AND gate where output of said OR gate is applied through a first amplifier to energize a two-pole double-throw first relay such that when said first relay is energized a voltage from said power source is applied through the closed contact of said vehicle ignition switch and through the closed first contact set of said first relay to the vehicle ignition system, (h) an Ok-To-Start indicator, electrically connected in parallel with the vehicle ignition system, that is energized by a voltage applied through the closed first contact set of said first relay, (i) a motor vehicle start switch where one side of said start switch is connected to said power source such that when said start switch is placed in the ON position a voltage from said power source is applied through the closed second contact set of said first relay to the vehicle start motor, (j) a rotational transducer assembly that produces a series of pulsed signals when said vehicle is moved, (k) an electronic counter that receives the signals from said rotational transducer assembly such that when said counter reaches a preset count level, corresponding to an established minimum travel distance, an output signal is produced, and (l) a first bistable latch that when set by the output signal from said electronic counter produces a signal that, when applied through said two-input OR gate and said first amplifier, maintains said first relay in an energized condition to keep the vehicle ignition system enabled after the preset time in said first timer and said second timer has expired.

2. The Delayed Vehicle Starter as specified in claim 1 further comprising a second optional circuit comprising:

(a) a second amplifier receiving its input from said three-input AND gate, (b) a two-pole double-throw second relay that is energized by applying the output from said second amplifier through the normally open contact of the first contact set of said second relay where said second relay remains latched by a subsequent voltage supplied by the power source through the closed vehicle ignition switch and the closed contact of the first contact set of said second relay, and (c) an electro-mechanical parking-brake interlock assembly having locking means such that when said assembly is deenergized said locking means maintains the set vehicle parking brake in the set position and that when said assembly is energized said locking means is released allowing the set brakes to be released by the driver, where said assembly is energized by a voltage from said power source applied through the closed second contact set of said second relay.

3. The Delayed Vehicle Starter as specified in claim 2 further comprising a third optional circuit consisting of an electro-mechanical transmission interlock assembly, connected in parallel with said brake-interlock assembly, having locking means such that when said assembly is deenergized said locking means maintains the transmission steering column lever in a locked position and that when said assembly is energized said locking means is released allowing the transmission to function normally, where said transmission interlock assembly is energized by a voltage from said voltage source also applied through the closed second contact set of said second relay.

4. The Delayed Vehicle Starter as specified in claims 2 or 3 further comprising an Interlocks Activated indicator that is electrically connected in parallel with said electro-mechanical parking-brake interlock assembly and said electro-mechanical transmission interlock assembly where said indicator illuminates when said assemblies are activated.

5. The Delayed Vehicle Starter as specified in claims 2 or 3 wherein said locking means of said electro-mechanical parking-brake interlock and said electro-mechanical transmission interlock is comprised of an armature controlled by a solenoid.

6. The Delayed Vehicle Starter as specified in claim 1 further comprising a fourth optional circuit that allows the delayed starting and minimum travel requirements of said first circuit to be bypassed and permit said vehicle to be normally started and operated, where said fourth circuit comprises:

(a) a second bistable latch, (b) an Emergency indicator connected to the output of said latch, (c) a single-pole double-throw emergency override switch having a first and a second position where in the first position a signal from said power source is applied to the input of said latch keeping said latch in an inactive condition and where in the second position the signal to said latch is removed causing said latch to set and illuminate said indicator and allow the signal from said power source to be applied directly to the inputs of said two-input OR gate and said second amplifier, and (d) a normally closed emergency reset switch connected from said power source to said latch such that when said reset switch is depressed said latch is reset and said indicator is turned off.

7. The Delayed Vehicle Starter as specified in claim 1 wherein said power source provides the full vehicle battery voltage and includes a power conditioner that provides voltages reduced to the required circuit levels.

8. The Delayed Vehicle Starter as specified in claim 1 wherein said first switch and said second switch are located respectively at the front and back of said vehicle.

9. The Delayed Vehicle Starter as specified in claim 1 wherein said first relay and said second relay are of the electro-mechanical type.

10. The Delayed Vehicle Starter as specified in claim 1 wherein said first relay and said second relay are solid state devices.

11. The Delayed Vehicle Starter as specified in claim 1 wherein said rotational transducer assembly is comprised of a plurality of magnets rigidly attached at equal points about the periphery of a rotating vehicle component and an inductive coil rigidly attached to a structural member of said vehicle in such a position and distance from said magnets that the rotational path of said magnets will cause an inductive pulse to be generated from said coil that is subsequently applied to said electronic counter.

12. The Delayed Vehicle Starter as specified in claim 11 wherein said rotating vehicle component consists of a vehicle drive shaft.

13. The Delayed Vehicle Starter as specified in claim 6 wherein said emergency reset switch is a key-operated type requiring a key to reset said first bistable latch and turn off said Emergency indicator.

* * * * *